United States Patent Office 2,873,943
Patented Feb. 17, 1959

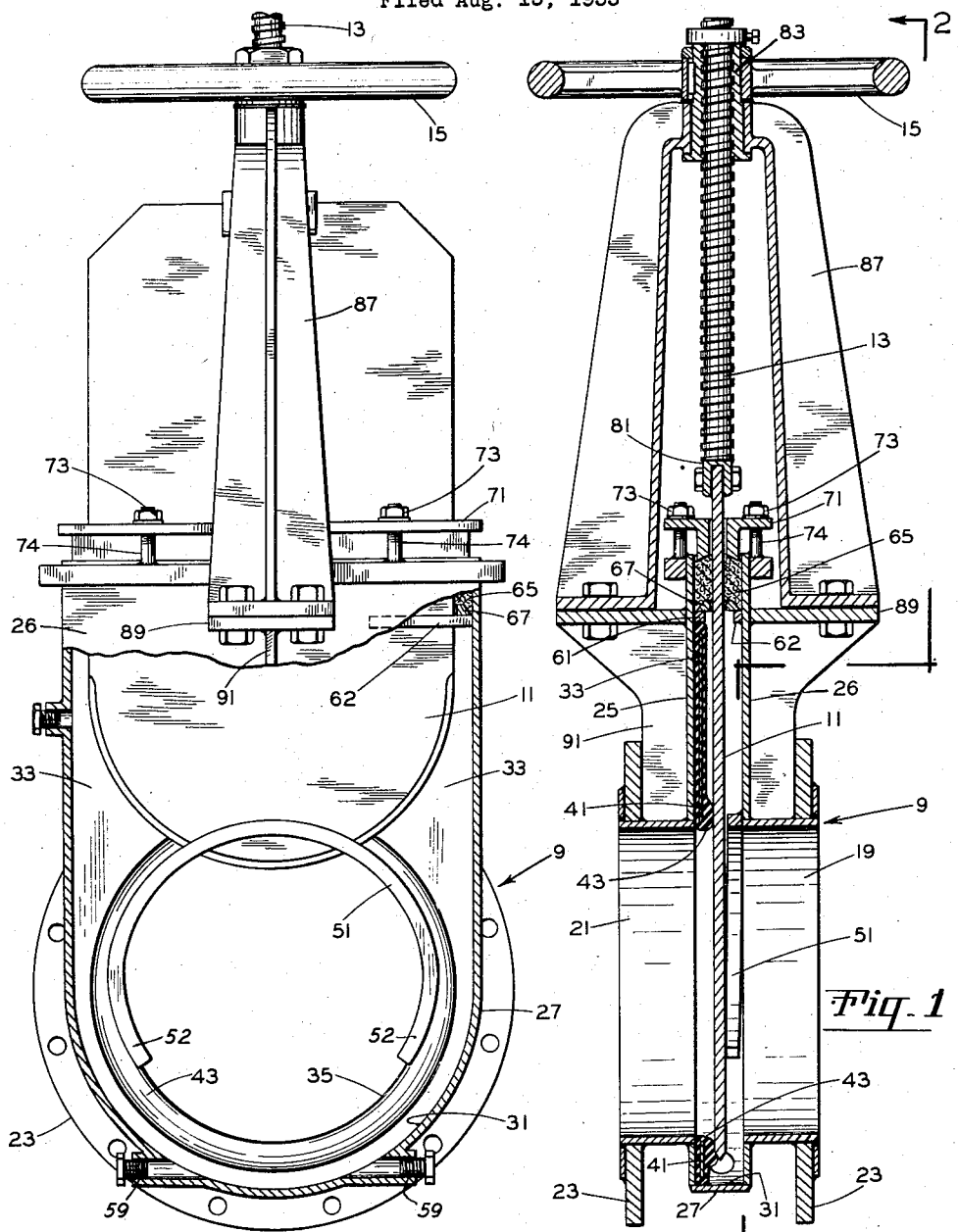

2,873,943

STOCK VALVE HAVING REMOVABLE SEAT

John L. Williams, Portland, Oreg.

Application August 15, 1955, Serial No. 528,374

1 Claim. (Cl. 251—175)

This invention relates to gate valves and particularly to gate valves for handling paper stock.

In my prior copending application entitled "Stock Valve," Serial No. 400,664, filed December 28, 1953, the valve disclosed includes a gate blade slidable between a pair of removable rubber seat members to form a water tight seal therewith. This valve is admirably suited for handling most paper stock concentrations, but when the paper stock concentration is very high it has been noticed that there is a tendency for the gate blade to push or force fibers between the seat members into the chamber or space therebetween so that the valve body must frequently be flushed in order to prevent excessive build-up of fibers within such space.

It is a main object of the present invention to provide a gate valve which overcomes the above problem, and more particularly to provide a gate valve constructed so that it is not possible for the blade to force pulp fibers into a confined chamber or space.

It is another object of the present invention to provide a gate valve having a removable seat member held within the body in a novel and inexpensive manner.

The gate valve of the present invention is characterized by having a single removable seat member engaged by one side of a gate blade, the body of the valve being formed to provide a recess or space into which the free end of the blade projects in the closed position thereof, said recess being of a size to remain at all times in communication with the flow passage of the valve. Thus pulp fibers, or the like, cannot be trapped within the recess.

Various other objects of the present invention will be apparent from the following description taken in connection with the accompanying drawings, wherein:

Fig. 1 is a vertical midsection of a valve embodying the concepts of the present invention; and Fig. 2 is a sectional view taken along line 2—2 of Fig. 1, showing the gate blade raised.

Referring to the accompanying drawings, the gate valve disclosed includes a valve body 9, a gate blade 11, a valve stem 13 for raising and lowering the gate blade, and a handwheel 15 for operating the stem.

More in detail, the valve body has a flow passage defined in part by a pair of aligned cylinders 19 and 21 having bolting flanges 23 welded to the outer ends thereof. The inner ends of the cylinders project into and are welded to the opposed end walls 25 and 26 of a valve chest. A U-shaped strap 27 is welded to the side and bottom edges of the end walls 25 and 26, as the parts are shown in the drawings, so that the chest provides a gate blade channel of approximately spade shape intersecting the flow passage.

It is pointed out at this time that the gate blade channel extends beyond the flow passage, in the direction of closing movement of the blade 11, and is wider than the flow passage, as is apparent from Fig. 2, so that the channel provides a groove 31 facing in the direction of opening movement of the blade 11. The blade has a semicircular lower end, as the parts are shown in the drawings, for projection into the groove 31.

Cooperatively and slidably received within the gate blade channel is a seat member 33 of generally spade shape having a portion surrounding the flow passage of the valve and providing a port 35 aligned with and of the same diameter as said flow passage. The seat member is constructed of an elastomer material, such as rubber or neoprene and is re-enforced to be self-supporting or form-sustaining by a metal insert plate 41, which is entirely enclosed within the elastomer material of the seat member and is apertured to surround port 35.

The inlet side, the right-hand side in Fig. 1, of seat member 33 is provided with an elastomer bead 43 surrounding the flow passage and providing a seat engageable by the blade 11. The outlet side of the seat member is flat, although a small annular bead may be provided thereon for engagement with the inner surface of the associated end wall 25.

The seat member 33 freely rests within the gate blade channel and means are provided for pressing the gate blade 11 against the bead 43 to form a seal between said bead and said blade and thereby forcing the outlet face of said member, that is, the left-hand face as the parts are shown in Fig. 1, against the opposed inner surface of the associated end plate 25 to form a seal therewith. These means are shown in the form of an arcuate backing member 51 which is arranged within the gate blade channel and is welded to the inlet end plate 26 in surrounding relation to the flow passage. The backing member 51 is welded only at the intermediate portion thereof, leaving the end portions free, and such end portions may be bent radially inwardly somewhat as shown in Fig. 2 and are bent in a direction toward the outlet end of the flow passage so as to be engaged by the blade 11, as the blade moves toward its closed position with relation to seat 43. Thus the spring fingers provided by the free ends of backing member 51 force the blade against the seat and the seat member against the inner surface of end plate 25 to form a seal between said seat member and said end plate.

It is apparent from the drawings that the groove 31, as well as the gate blade channel, is wider than the combined thickness of the blade 11 and the seat member 33 thus to leave a space or recess between the inlet side of the lower or free end of the gate blade and the lower portion of end plate 26, in the closed position of the blade, so that pulp fibers cannot be trapped and packed down within groove 31. Thus the difficulty heretofore mentioned of pulp fibers being packed into a chamber is eliminated.

The upper end of the seat member 33, as the parts are shown in Fig. 1, is forced beneath a pair of lugs 61 welded to the inner surface of end plate 25. A similar pair of lugs 62 is provided on the inner wall of end plate 26 at the same level. These lugs, the extreme upper portions of the end plates of the chest and the upper portions of the strap 27 provide a packing box receiving packing 65, which is supported on a rectangular loop-shaped retainer 67 resting on lugs 61 and 62. A suitable packing gland 71 fits within the upper end of the valve chest and is retained in place by nuts 73 threaded on studs 74.

Lugs 61 are spaced from lugs 62 a sufficient distance to enable the seat member 33 to be installed and removed therebetween.

The gate blade 11 is connected at its upper end by a conventional clevis arrangement at 81 to the lower end of stem 13, and the stem extends at its upper end through a conventional nut 83 to which the hand-wheel 15 is fixed and which is rotatably carried by the yoke 87. The lower ends of the yoke are mounted upon base plates 89 which are fixedly secured to the end plates 25 and 26 and are joined by webs 91 to such end plates, to cylinders 19 and 21 and to bolting flanges 23.

Having described the invention in what is considered to be the preferred embodiment thereof, it is desired that it be understood that the invention is not to be limited other than by the provisions of the following claim.

I claim:

A gate valve comprising a valve body formed with a flow passage having inlet and outlet ends, said body including a chest having an inlet end plate and an outlet end plate disposed in spaced relation and a U-shaped strip connecting the end plates, and together with said end plates defining a U-shaped gate blade channel intersecting said flow passage, a gate blade movable in said channel from an open to a closed position with respect to said passage, said channel extending beyond said passage in the direction of closing movement of said blade and being wider than said passage to provide a groove facing the direction of opening movement of said blade for receiving an end of said blade when said blade is in its closed position, a single removable seat member of flat platelike spade shape slidably resting within said U-shaped channel and groove and being located between said blade and said outlet end plate whereby said seat member is supported by said U-shaped strip and by said outlet end plate, said seat member having a port in register with said flow passage and having sufficient rigidity to be self-supporting within said chest, the side of said seat member remote from said outlet end plate having an annular elastomer bead engageable by said gate blade, backing means spaced from the portion of said groove which receives the tip of said blade end for forcing said blade against said seat member to effect a seal therebetween and for forcing said seat member against said outlet end plate to form a seal between said outlet end plate and said seat member, the seal between said seat member and said outlet end plate being formed because of the pressure exerted by said backing means on said seat member through the medium of said gate blade, said portion of said groove being wider than the combined thickness of said seat member and said blade to provide a space between the inlet side of said blade end and said inlet end plate in the closed position of said blade whereby stock fibers cannot be compacted in said groove by said blade tip and may readily be washed out when said gate blade is open, said backing means being disposed to pressingly engage said blade only after said blade has moved a substantial extent toward its closed position and to release said blade after said blade has left its closed position and before said blade has reached its fully open position.

References Cited in the file of this patent

UNITED STATES PATENTS

| | | |
|---|---|---|
| 966,713 | Snow | Aug. 9, 1910 |
| 977,271 | Callaghan | Nov. 29, 1910 |
| 1,586,345 | Wilson | May 25, 1926 |
| 2,636,713 | Hamer | Apr. 28, 1953 |
| 2,701,117 | Bashark | Feb. 1, 1955 |
| 2,732,170 | Shand | Jan. 24, 1956 |

FOREIGN PATENTS

| | | |
|---|---|---|
| 61,000 | Germany | 1892 |
| 34,281 | Denmark | Mar. 6, 1925 |
| 295,520 | Great Britain | Aug. 16, 1928 |